US008358661B2

(12) United States Patent
Armstrong et al.

(10) Patent No.: US 8,358,661 B2
(45) Date of Patent: Jan. 22, 2013

(54) REMOTE ADAPTER CONFIGURATION

(75) Inventors: William J. Armstrong, Rochester, MN (US); Josep Cors, Rochester, MN (US); David R. Engebretsen, Cannon Falls, MN (US); Jeffrey J. Lynch, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/763,323

(22) Filed: Apr. 20, 2010

(65) Prior Publication Data
US 2011/0258641 A1 Oct. 20, 2011

(51) Int. Cl.
*H04L 12/28* (2006.01)
(52) U.S. Cl. ......... 370/401; 710/311; 710/312; 710/317
(58) Field of Classification Search .................. 370/230, 370/232, 285, 390, 392, 398, 401, 412; 710/311, 710/312, 317
See application file for complete search history.

(56) References Cited

U.S. PATENT DOCUMENTS

| | | | | |
|---|---|---|---|---|
| 2003/0037163 A1* | 2/2003 | Kitada et al. | ................... | 709/236 |
| 2004/0199698 A1* | 10/2004 | Bolian et al. | ................... | 710/305 |
| 2006/0248158 A1* | 11/2006 | Ha et al. | ........................ | 709/208 |
| 2007/0047536 A1* | 3/2007 | Scherer et al. | ................ | 370/360 |
| 2007/0260910 A1 | 11/2007 | Jain et al. | | |
| 2007/0299987 A1 | 12/2007 | Parker et al. | | |
| 2010/0128605 A1* | 5/2010 | Chavan et al. | ............. | 370/230.1 |
| 2011/0055433 A1* | 3/2011 | Kishore et al. | .................... | 710/9 |
| 2011/0103391 A1* | 5/2011 | Davis et al. | ................... | 370/400 |

OTHER PUBLICATIONS

IBM U.S. Appl. No. 12/763,306 entitled "Distributed Virtual Bridge Management," filed Apr. 20, 2010 by William J. Armstrong et al.

* cited by examiner

*Primary Examiner* — Hassan Phillips
*Assistant Examiner* — Ajay Cattungal
(74) *Attorney, Agent, or Firm* — Toler Law Group

(57) ABSTRACT

Systems and methods to remotely configure adapters are described. A particular method may include generating a management frame at a controlling bridge. The management frame may include instructions to configure an operating parameter of the adapter. The management frame may be communicated to a bridge element of a plurality of interconnected bridge elements in communication with the controlling bridge. The bridge element may be coupled to the adapter, and the operating parameter of the adapter may be configured.

20 Claims, 5 Drawing Sheets

REMOTE ADAPTER CONFIGURATION

I. FIELD OF THE DISCLOSURE

The present disclosure relates generally to data communications, and more specifically, to configuring adapters in a highly integrated computer network.

II. BACKGROUND

Server computers are continuously managed to enable access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

Increasing the number of switches and associated connections to accommodate additional traffic may present configuration and management challenges. For example, highly integrated environments may rely on a relatively large number of dispersed hardware adapters to convert networked data packets. The operating parameters of the adapters are conventionally configured by trusted code present on microprocessors that are directly coupled to each adapter. It is desirable to increase the efficiency with which functions of an adapter may be configured within a highly integrated environment, such as a storage area network (SAN).

III. SUMMARY OF THE DISCLOSURE

In a particular embodiment, an apparatus is disclosed that includes a plurality of server computers and a plurality of bridge elements coupled to the plurality of server computers. The plurality of bridge elements may be configured to forward a data frame between the plurality of server computers. An adapter may be coupled to a bridge element of the plurality of bridge elements. A controlling bridge may be coupled to the bridge element and may configure an operating parameter of the adapter.

In another embodiment, a method of configuring an operating parameter of an adapter is disclosed. The method includes generating a management frame at a controlling bridge. The management frame may include an instruction to configure an operating parameter of the adapter. The management frame may be communicated to a bridge element of a plurality of interconnected bridge elements in communication with the controlling bridge. The bridge element may be coupled to the adapter. The operating parameter of the adapter may be configured.

In another embodiment, a program product includes program code executable to generate a management frame at a controlling bridge, where the management frame includes an instruction to configure an operating parameter of an adapter. The program code may be executed to communicate the management frame to a bridge element of a plurality of interconnected bridge elements in communication with the controlling bridge. The bridge element may be coupled to the adapter. The program code may further be executed to configure the operating parameter of the adapter. The program product includes a computer readable medium bearing the program code.

At least one of the embodiments may allow the configuration of remote adapters in a highly integrated environment. The automated adapter configuration may reduce potential bottlenecks and facilitate efficient processing. An embodiment of a system may be scalable to include hundreds or more server computers with direct connectivity.

Features that characterize embodiments of the invention are set forth in the claims annexed hereto and forming a further part hereof. However, for a better understanding of embodiments of the invention, and of the advantages and objectives attained through its use, reference should be made to the Drawings and to the accompanying descriptive matter in which there are described exemplary embodiments of the invention.

IV. BRIEF DESCRIPTION OF THE DRAWINGS

V. DETAILED DESCRIPTION

Figure 1:
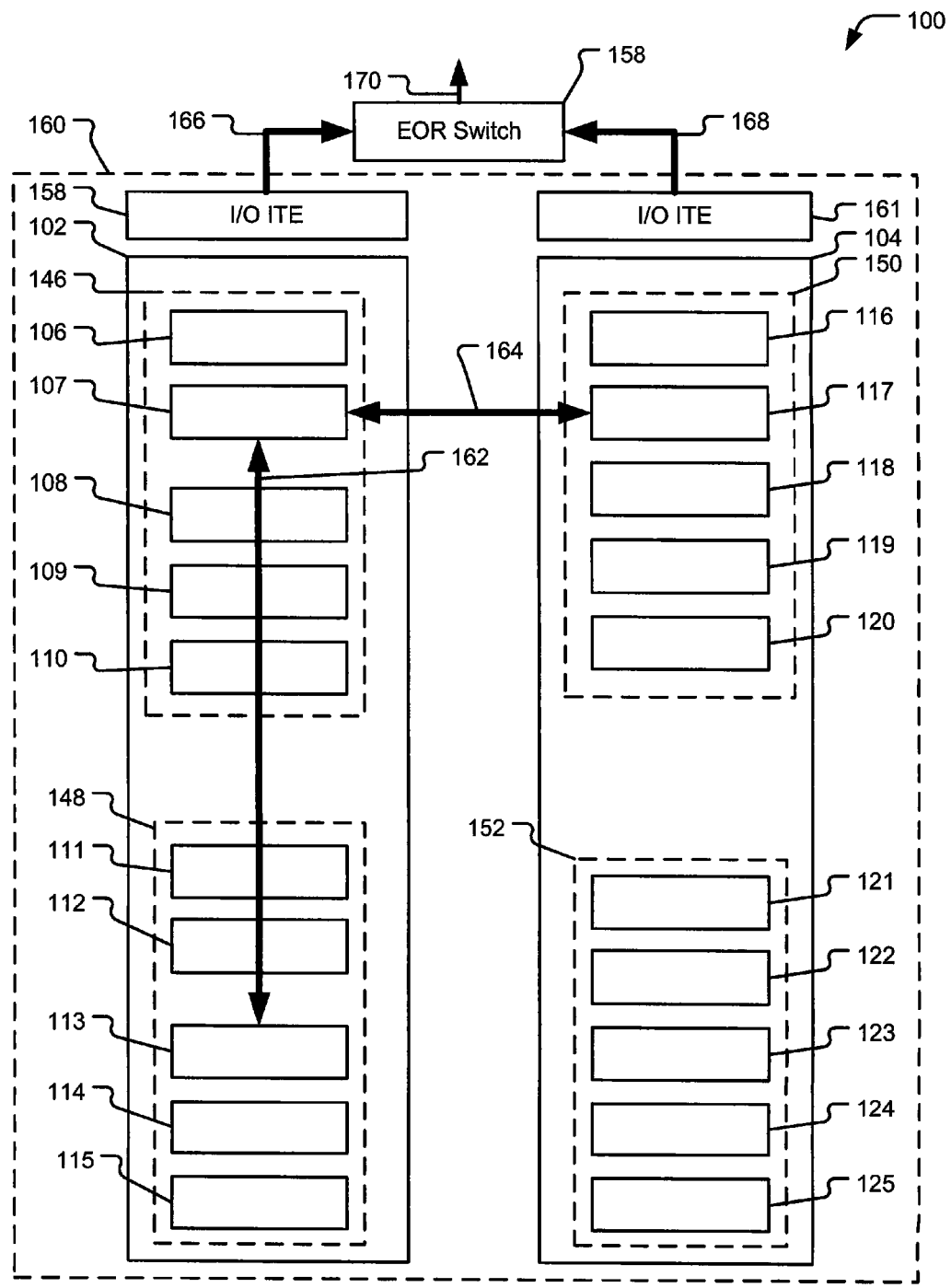
FIG. 1 is a block diagram of an embodiment of a highly integrated computing system configured to allow direct communication between server computers housed within different racks and chassis of blade server computers.

Data frame communication may be improved by remotely configuring an adapter functioning within a highly integrated and scalable network. Operating parameters of the adapter may be automatically configured by firmware of a controlling bridge. For example, the controlling bridge may generate and forward management frames to the adapter via a bridge element.

The bridge element may provide an interface between the adapter and the controlling bridge, thus enabling the controlling bridge to implement a remote base function device driver. Through the bridge element, the controlling bridge may interact directly with the adapter.

An adapter, such as a multi-root input/output virtualization (MRIOV) adapter, may include a base function comprising a Virtual Ethernet Bridge (VEB). The base function may be remotely configured using the management frames sent over a physical Ethernet link.

The adapter may be aware of the remote base function device driver of the controlling bridge. The adapter may enable a network interface with the bridge element. The adapter may not be visible to an information technology element (ITE) coupled to the adapter. A path from the controlling bridge may be provided via a distributed bridge to the adapter to program operating parameters, including those affecting the VEB of the adapter. The controlling bridge may provide the operating parameters to the bridge element using management frames (e.g., Ethernet frames). The bridge element may communicate the operating parameters to the adapter during linkup negotiations.

An I/O management controller may include the controlling bridge. The controlling bridge may be collocated with or otherwise positioned within the same domain as a Peripheral Component Interconnect Manager (PCIM). The PCIM may be configured to control the configuration, management, and error handling of physical and virtual functions of adapters. At least one of the controlling bridge and the PCIM may include a trusted base code (e.g., a base function device driver) that is used to remotely configure the base function of the adapter. The base code is trusted because it may execute on a device that is protected from intrusion or is known to reside within a secure environment.

An illustrative operating parameter may help prevent hypervisors that share an adapter from interfering with one another. An operating parameter may facilitate the segregation of virtual logical networks (VLANs) at an adapter. Another operating parameter may affect Layer 2 access control list enforcement, as applied against virtual hierarchies. A virtual hierarchy may include a portion of a multi-root topology. The multi-root topology may be assigned to a Peripheral Interconnect Express (PCIe) hierarchy, where each virtual hierarchy has its own memory, I/O, and configuration space. A PCIe hierarchy may include a root device and associated endpoint devices. Multiple hierarchies may be independent of and segregated from other hierarcharies.

In a shared I/O drawer, a PCIM device driver may set the parameters against each virtual hierarchy. The base function of the adapter is preferably managed by a trusted base code to manage physical and virtual functions. In a highly distributed environment, a trusted base code may not be present on a microprocessor that is directly coupled to each adapter. In such a scenario, the controlling bridge may access the trusted code (e.g., base function device driver) to configure controls and parameters of networked adapters. The base function device driver may configure operating parameters against virtual hierarchies in the adapter.

The bridge elements of a distributed virtual bridge may be interconnected and managed using management frames generated by the controlling bridge. A number of the adapters may have a trunk port that is connected to a bridge element. An adapter may comprise an Ethernet switch that is coupled to a bridge element. The bridge element may be a "north" bridge element that is included in a remote microchip. The direct coupling between the adapter and the bridge element may comprise stacked switches. The bridge element may be remotely coupled to another bridge element via a proprietary packet based interconnect that includes an integrated switch router. The controlling bridge may manage network routing of data frames that are transported through the distributed virtual bridge.

The controlling bridge may communicate with or otherwise be coupled (remotely or directly) to each bridge element of the distributed virtual bridge. The controlling bridge may program the bridge elements using management frames that include a configuration protocol. The controlling bridge may further configure the base functions of adapters in the distributed virtual bridge. For example, the controlling bridge may configure a VEB of a base function.

The controlling bridge may generate and send a management frame over an Ethernet physical link via a bridge element. According to a first embodiment, the bridge element may provide a communication channel for forwarding the management frame from the controlling bridge to the adapter. The management frame may include a configuration protocol that is used to perform base function management in an adapter. In a second embodiment, the management frame may program the bridge element to transfer an instruction (retrieved from the management frame) to the adapter. For example, the bridge element may transfer an instruction to configure an operating parameter of the adapter during linkup (e.g., when the adapter and the bridge element connect).

The controlling bridge may access operating parameters via an entrusted interface of a distributed virtual bridge (e.g., a bridge element). According to an embodiment, the PCIM and the controlling bridge may execute on a common I/O management controller. The PCIM and the controlling bridge may thus share a common domain. Alternatively, the controlling bridge may be programmed with the operating parameters by an administrator.

An embodiment of a controlling bridge, a bridge element, and an adapter may work in combination to achieve programming efficiencies in firmware and hardware. The programming efficiencies may translate into increased routing performance and reduced administrative workload.

Turning particularly to the drawings, FIG. 1 shows an illustrative embodiment of a highly integrated system 100 configured to forward data frames using a distributed virtual bridge 160. The distributed virtual bridge 160 may extend across server computers 106-125, chassis 146, 148, 150, 152, and racks 102, 104 to provide data link layer (i.e., Layer 2) switching between bridge elements. The bridge elements may provide a frame-based, Ethernet-like interface. The interface may facilitate lossless, point-to-point, in-order frame delivery between server computers 106-125 of different racks 102, 104 or chassis 146, 148, 150, 152 (i.e., east-west connectivity) with reduced redundancy and latency.

The system 100 further includes an end-of-rack switch 158 and input/output (I/O) server ITEs 159, 161 that enable north-south connectivity. The I/O server ITEs 159, 161 may enable uplink connectivity to the external Ethernet network (or other network) for the server computers 106-125 housed within the racks 102, 104.

An arrow 164 of FIG. 1 represents direct east-west connectivity and the flow of data frames between server computers located in different racks 102, 104 of the system 100 (e.g., without using a top of rack or chassis switch). An arrow 162 represents direct east-west connectivity across different chassis 146, 148 of the rack 102.

The system 100 of FIG. 1 may enable direct connectivity between server computers of different racks or chassis. To accommodate the relatively high level of system integration, management frames may be forwarded to remotely program adapters, as discussed herein.

Figure 2:
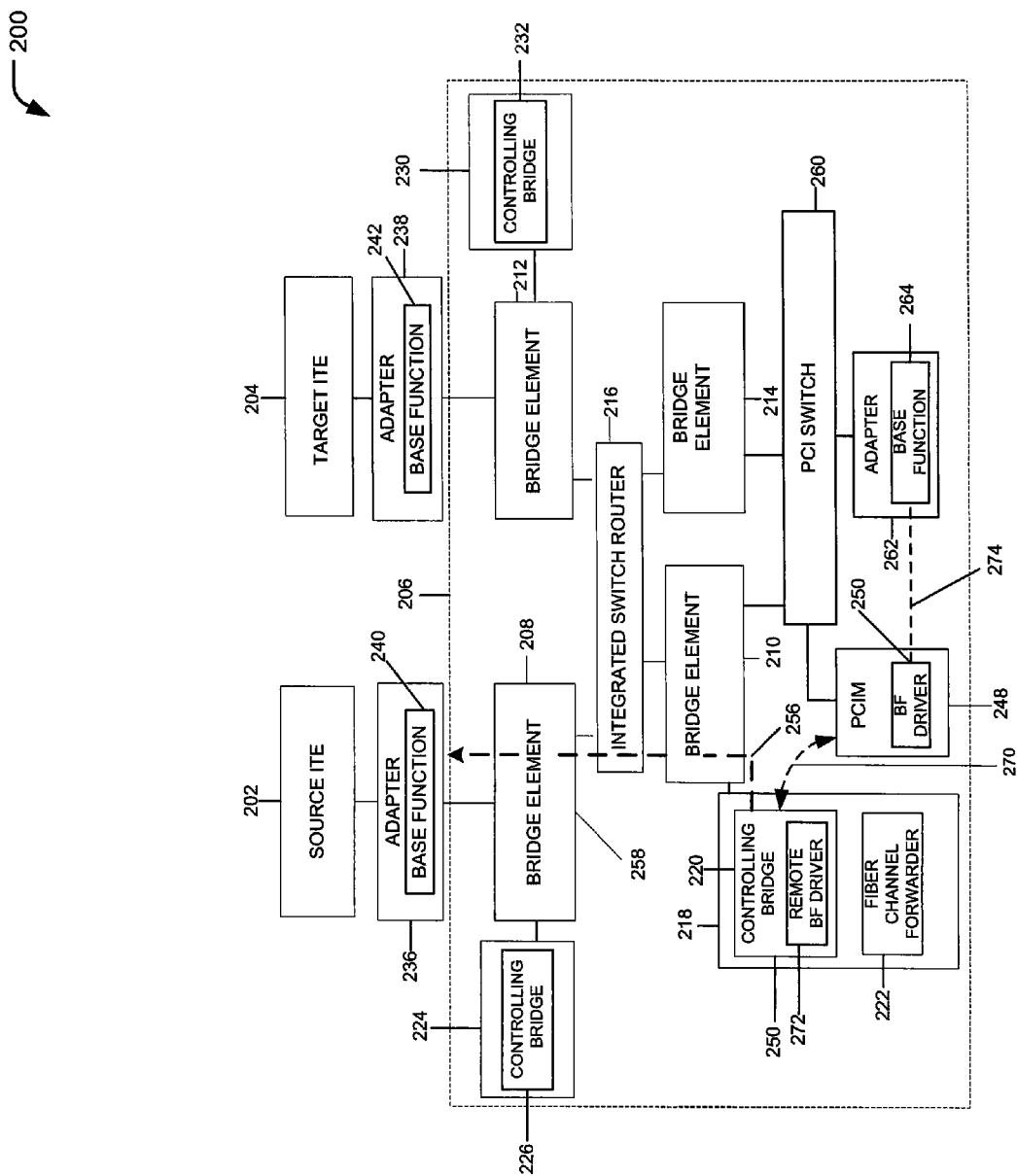
FIG. 2 is a diagram of a particular embodiment of a system configured to remotely program adapters using one or more controlling bridges.

FIG. 2 shows a particular illustrative embodiment of a highly integrated computer system configured to remotely program adapters. The system 200 may include a source ITE 202 that is coupled to a target ITE 204 via adapters 236, 238 and a distributed virtual bridge 206. The distributed virtual bridge 206 may include multiple bridge elements 208, 210, 212, and 214 that are coupled via an integrated switch router 216. The adapter 236 may be coupled to the bridge element 208, and the adapter 238 may be coupled to the bridge element 212. More particularly, the adapter 236 may be directly coupled via a cable (e.g., in a stacked configuration) to the bridge element 208. Similarly, the adapter 238 may be stacked with the bridge element 212. In one respect, the distributed virtual bridge 206 may comprise a Converged Enhanced Ethernet (CEE) switch.

The adapter 236 may include an MRIOV adapter. A base function 240 of the adapter 236 may comprise operating parameters of the adapter 236. An illustrative operating parameter may help prevent entities that share the adapter 236 from interfering with one another. Another operating parameter may facilitate the segregation of VLANs at the adapter 236. VLANs may be used to segregate traffic and to allow more than one uplink for the adapter 236. Another operating parameter may affect Layer 2 access control list enforcement, as applied against virtual hierarchies. The base function 240 may comprise a Virtual Ethernet Bridge (VEB) and may be remotely configured using a management frame having a configuration protocol.

A controlling bridge 220 may generate and send the management frame through a path 256 that includes the bridge element 210, the integrated switch router 216, and the bridge element 208. The management frame may include an instruction to configure an operating parameter of the base function 240.

In an embodiment, the management frame may be forwarded from the bridge element 208 to the adapter 236. The adapter 236 may process the management frame to retrieve the instruction and configure the operating parameter. In another embodiment, the bridge element 208 may process the management frame and communicate the instruction to the adapter 236. For example, the bridge element 208 may communicate the instruction to the adapter 236 during linkup. The adapter 236 may use the instruction to configure an operating parameter of the base function 240.

The adapter 238 may include its own, remotely programmable base function 242. The base function 242 may be configured using a management frame sent from a controlling bridge 220, 226, and 232. For example, the management frame may be forwarded to the adapter 238 via the bridge element 212. In another embodiment, the bridge element 212 may receive the management frame and may communicate to the adapter 238 an instruction to configure the base function 242.

The distributed virtual bridge 206 may include an I/O blade computing device 218 that includes the controlling bridge 220 and a Fiber Channel Forwarder 222. The I/O blade computing device 218 may be directly coupled to the bridge element 210. For example, a cable may connect the I/O blade computing device 218 and the bridge element 210.

The controlling bridge 220 may be configured to interface with and program the bridge elements 208, 210, 212, and 214 and the adapters 236, 238. For example, the controlling bridge 220 may be configured to generate and send a management frame to one or more of the bridge elements 208, 210, 212, and 214 and the adapters 236, 238.

In the case of the bridge elements 208, 210, 212, and 214, the management frame may be executed to modify bridge element operations. Illustrative bridge element operations may relate to routing processes or stored data. For example, an instruction may affect how or to where certain data frames are routed. Another bridge element operation may initiate the storage of updated address data at the bridge elements 208, 210, 212, and 214.

As discussed herein, a management frame to configure the adapters 236, 238 may be communicated from one or more of the controlling bridges 220, 226, and 232 to an adapter 236, 238 via one or more bridge elements 208, 210, 212, and 214. The management frame may include an Ether Type associated with a configuration protocol. At least one of the bridge elements 208, 210, 212, and 214 and the adapters 236, 238 may recognize the Ether Type as being associated with a management frame that includes the instruction to configure a base function 240, 242. In this manner, the controlling bridge 220 may be configured to concurrently configure one or more of the adapters 236, 238.

The bridge element 208 may be directly coupled to a computing device 224 (e.g., an I/O blade device) that includes the controlling bridge 226. A computing device 230 may be directly coupled to the bridge element 212 and may include a controlling bridge 232. The controlling bridges 220, 226, and 232 may be coupled to one another, as well as to the bridge elements 208, 210, 212, and 214 and to the adapters 236, 238.

A Peripheral Interconnect Manager (PCIM) 248 may include a base function device driver 250 and be coupled to a PCI switch 260. The PCIM 248 may be configured to control the configuration, management, and error handling of a base function 264 of an adapter 262 that is coupled to the PCI switch 260. The base function device driver 250 may comprise a trusted base code that configures the base function 264 of the adapter 262, as depicted by a logical connection 274.

A portion of the system 200 shown in FIG. 2 located above the integrated switch router 216 and associated with the ITEs 202, 204 may be referred to as a north portion. The bridge elements 210, 214, the adapter 262, and the I/O blade device 218 may be categorized as being included within a south portion of the system 200 because they are coupled to or otherwise associated with an uplink to an Ethernet network.

The controlling bridge 220 may include or otherwise have access to a remote base function device driver 272. For example, the controlling bridge 220 may be programmed to include the remote base function device driver 272, including operating parameters input by an administrator. Alternatively, the controlling bridge 220 may access the base function device driver 250 via an entrusted (network) interface 270 with the PCIM 248 that includes the PCI switch 260 and the bridge element 210. In another embodiment, the PCIM and the controlling bridge may execute on a common I/O management controller.

FIG. 2 thus shows a highly integrated system 200 having controlling bridges 220, 226, and 232 that may each be configured to program the adapters 236, 238. The controlling bridges 220, 226, and 232 may send management frames to the adapters 236, 238 via at least one of the bridge elements 208, 210, 212, and 214. The management frames may include an instruction to configure an operating parameter of the adapters 236, 238. The automated programming of the adapters 236, 238 may enable greater scalability and routing efficiency, while reducing administrator workload.

Figure 3:
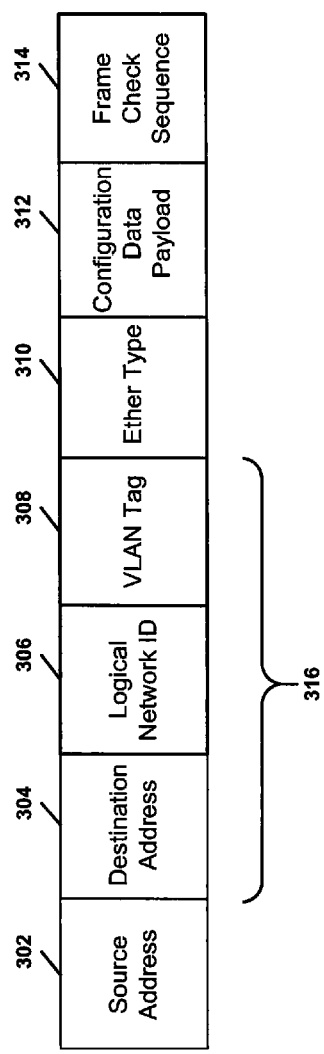
FIG. 3 is a diagram of a management frame configured to be forwarded by the system of FIG. 2.

FIG. 3 is an embodiment of an illustrative management frame 300 that may be generated by a controlling bridge, such as the controlling bridges 220, 226, and 232 of FIG. 2. The management frame 300 may include address data, such as Media Access Control (MAC) addresses (e.g., a source address 302) and a routing key 316 used by the distributed virtual bridge 206 of FIG. 2 to forward the management frame 300.

In addition to the source address 302, the management frame 300 may include a destination address 304. The destination address 304 and the source address 302 may comprise MAC addresses. MAC addresses are typically constructed by a Fiber Channel Forwarder, such as the Fiber Channel Forwarder 222 of FIG. 2. An illustrative MAC address may include a combination of three-bytes of a destination identifier associated with a destination node (e.g., a MAC address of a server computer or virtual machine) and three-bytes of Fiber Channel (FC) mapping information assigned by the Fiber Channel Forwarder. A MAC address of an embodiment may include an Internet Protocol address. In FIG. 3, the source address 302 may be a MAC address of a controlling bridge, such as a controlling bridge 220, 226, or 232 of FIG. 2. The destination address may be a MAC address of an adapter (or bridge element proximate an adapter) to be programmed, such as the adapters 236, 238 of FIG. 2.

A logical network identifier 306 may indicate a logical network associated with the management frame 300. For example, the logical network identifier 306 may be assigned to the switch to which the management frame 300 is addressed. A logical network may be included to provide an additional layer of traffic separation. A VLAN tag 308 may indicate a VLAN assigned to the management frame 300. The VLAN may be associated with multiple switches, such as the bridge elements 208, 210, 212, 214 and the adapters 236, 238 of FIG. 2.

The Ether Type 310 of the management frame 300 may indicate a protocol of the payload 312. For example, the Ether Type 310 may indicate that the protocol of the payload 312 is a predetermined configuration protocol. The predetermined configuration protocol may be identified by a receiving switch, such as the bridge elements 208, 210, 212, 214 and the adapters 236, 238 of FIG. 2. The configuration data of the payload 312 may be used to modify an operating parameter of the adapter. The Ether Type of a non-management data frame may include FCoE. Such a data frame may be routed normally by a bridge element (e.g., without initiating adapter configuration processes).

A Frame Check Sequence (FCS) 314 may include a checksum added to the management frame 300. The FCS 314 may facilitate error detection and correction.

The management frame 300 may be generated by a controlling bridge to configure multiple adapters. Management frames may be routed through a network to concurrently program adapters without burdening administrators with manual configuration tasks.

Figure 4:
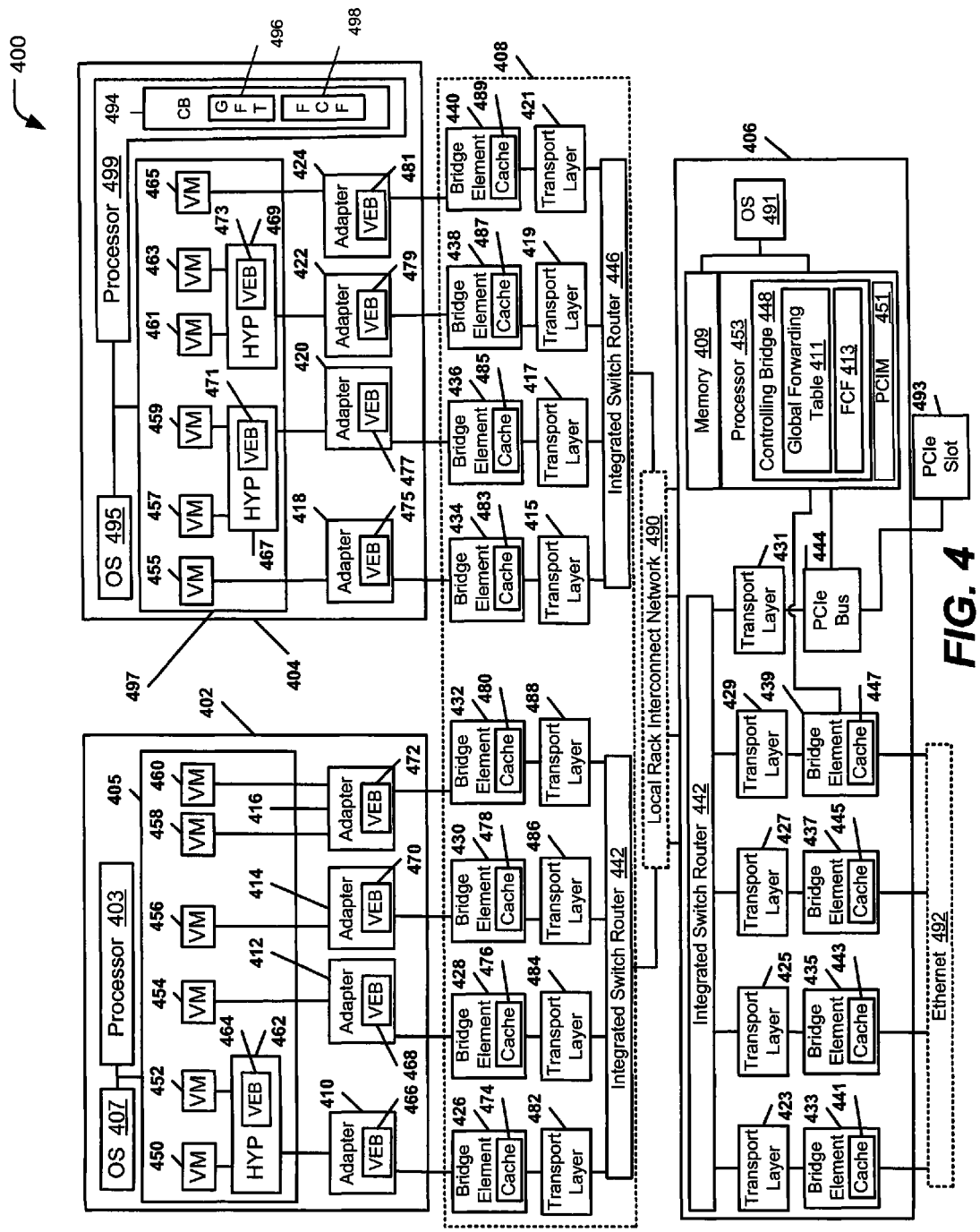
FIG. 4 is a diagram of another particular embodiment of a system configured to remotely program adapters using one or more controlling bridges.

Referring to FIG. 4, another particular illustrative embodiment of a highly integrated system 400 configured to configure adapters is depicted. FIG. 4 generally shows a computer system 400 configured to forward data frames using a distributed virtual bridge 408. The distributed virtual bridge 408 may selectively forward management frames to distributed switches (e.g., bridge elements and adapters).

The distributed virtual bridge 408 may be similar to the distributed virtual bridge 206 of FIG. 2. The system 400 includes a first server computer 402 and a second server computer 404 that are both coupled to an I/O blade device 406 via the distributed virtual bridge 408. The server computers 402, 404 and the I/O blade device 406 may be housed within separate chassis and racks.

The distributed virtual bridge 408 may be coupled to multiple adapters 410, 412, 414, 416, 418, 420, 422, and 424. The adapters 410, 412, 414, 416, 418, 420, 422, and 424 may be located within or may be coupled to the server computers 402, 404. The distributed virtual bridge 408 may use multiple access points, or bridge elements 426, 428, 430, and 432-440 to couple to the server computers 402, 404. For example, a microchip that includes the bridge elements 426, 428, 430, and 432 may be cabled or otherwise coupled to a port of the server computer 402 that includes the adapter 410. As explained herein, the distributed virtual bridge 408 may functionally supplant chassis switches and top of rack switches with a frame-based network fabric that functions in a similar fashion to an Ethernet network.

One or more transport layer modules 482, 484, 486, and 488 coupled to the bridge elements 426, 428, 430, and 432 may provide a frame-based, Ethernet-like interface to one or more integrated switch routers 442. The transport layer module 482 may be configured to deconstruct a transmission of data frames so that packet information may be evenly distributed across links to a local rack interconnect 490. The data frames may not be serialized upon leaving the transport layer module 482. A receiving transport layer module 423 may serialize the data frames to achieve reliable, in-order delivery. If the receiving transport layer module 423 determines that data frame information is missing, the transport layer module 423 may initiate a process to recover the missing data. The translation process may be accomplished in hardware, which may provide a larger bandwidth and faster processing than software applications. The transport layer modules 482, 484, 486, and 488, the integrated switch router 442, and the local rack interconnect network 490 may combine to include an underlying lossless, point-to-point communication network (i.e., an integrated switch router network) between the server computers 402, 404 and the I/O blade device 406.

The bridge elements 426, 428, 430, and 432 may function as data link layer (i.e., Layer 2) bridge forwarders within the distributed virtual bridge 408. In particular embodiments, the bridge elements 426, 428, 430, and 432 may comprise a switch, or router device. The bridge elements 426, 428, 430, and 432 may include learned (e.g., received and stored) cached address data used to forward data frames throughout the distributed virtual bridge 408. The learned address data may correspond to one or both of a destination address and a source address associated with a data frame.

When the bridge element 426 does not include address data pertinent to a source or destination address of a received data frame, the bridge element 426 may query a controlling bridge 448 for the address data. The controlling bridge 448 may include a global forwarding table 411 that includes stored address data. The stored address data may be continuously updated by the bridge elements 426, 428, 430, and 432. For example, a bridge element 426 may send an update message to the controlling bridge 448 in response to learning an updated or new MAC address. A corresponding MAC address in the global forwarding table 411 may be subsequently updated.

Conversely, the address data of the global forwarding table 411 may be used to update the bridge elements 426, 428, 430, and 432. For example, the controlling bridge 448 may respond to a query from the bridge element 426 with requested address data. The bridge element 426 may cache the received address data for future use.

The first server computer 402 may comprise a blade server computer, such as the server computer 102 shown in FIG. 1. The first server computer 402 may include one or more virtual machines (VMs) 450, 452, 454, 456, 458, and 460. A virtual machine may include a software implementation of a computer and may execute programs in a manner similar to a physical machine.

FIG. 4 shows an illustrative hypervisor 462 that is coupled to both the virtual machine 450 and the virtual machine 452. The hypervisor 462 may include platform virtualization software that allows multiple operating systems to run concurrently on the first server computer 402. The hypervisor 462 may include a hypervisor virtual bridge 464 that allows direct communication between the virtual machines 450, 452 without traversal of an external network. In one embodiment, the hypervisor virtual bridge 464 may register address information with the controlling bridge 448.

The server computer 402 may include at least one processor 403 coupled to a memory 405. The processor 403 may represent one or more processors (e.g., microprocessors), and the memory 405 may represent random access memory (RAM) devices comprising the main storage of the server computer 402, as well as supplemental levels of memory, e.g., cache memories, non-volatile or backup memories (e.g., programmable or flash memories), read-only memories, etc. In addition, the memory 405 may be considered to include memory storage physically located in the server computer 402 or on another server computer 404 coupled to the server computer 402 via the distributed virtual bridge 408.

The first server computer 402 may operate under the control of an operating system (OS) 407 and may execute or otherwise rely upon various computer software applications, components, programs, objects, modules, and data structures, such as the virtual machines 450, 452, 454, 456, 458, and 460.

Moreover, various applications, components, programs, objects, modules, etc. may also execute on one or more processors in another device coupled to the server computer 402 (e.g., in a distributed computing environment, where computing processes may be allocated to multiple server computers).

The first server computer 402 may include adapters 410, 412, 414, and 416, such as converged network adapters. A converged network adapter may include a single root I/O virtualization (SR-IOV) adapter, such as a Peripheral Component Interconnect Express (PCIe) adapter that supports Converged Enhanced Ethernet (CEE). Another embodiment of the system 400 may include a multi-root I/O virtualization (MR-IOV) adapter. The adapters 410, 412, 414, and 416 may be used to implement an FCoE protocol. Each adapter 410, 412, 414, and 416 may be coupled to one or more of the virtual machines 450, 452, 454, 456, 458, and 460. The adapters 410, 412, 414, and 416 may facilitate shared access of the virtual machines 450, 452, 454, 456, 458, and 460. While the adapters 410, 412, 414, and 416 are shown in FIG. 4 as being included within the server computer 402, adapters of another embodiment may include physically distinct devices that are separate from the server computers 402, 404.

Each adapter 410, 412, 414, and 416 may include a converged adapter virtual bridge 466, 468, 470, and 472. The converged adapter virtual bridges 466, 468, 470, and 472 may facilitate sharing of the adapters 410, 412, 414, and 416 by coordinating access by the virtual machines 450, 452, 454, 456, 458, and 460. Each converged adapter virtual bridge 466, 468, 470, and 472 may recognize data flows included within its domain. A recognized domain address may be routed directly, without processing or storage outside of the domain of the particular converged adapter virtual bridge 466, 468, 470, and 472. Each adapter 410, 412, 414, and 416 may include one or more CEE transmit ports that couple to one of the bridge elements 426, 428, 430, and 432. In another embodiment, bridge elements may be co-located with the adapters, and coupling between adapters and the bridge elements may not be Ethernet connections.

The bridge elements 426, 428, 430, and 432 may be configured to forward data frames throughout the distributed virtual bridge 408. The bridge elements 426, 428, 430, and 432 may thus function as access points for the distributed virtual bridge 408 by translating between Ethernet and the integrated switch router 442. The bridge elements 426, 428, 430, and 432 may not include buffers and may support CEE at boundaries of the distributed virtual bridge 408. In another embodiment, the bridge elements 426, 428, 430, and 432 may include buffers.

Each bridge element 426, 428, 430, and 432 of the distributed virtual bridge 408 may include a forwarding cache 474, 476, 478, and 480. A forwarding cache 474, 476, 478, and 480 may include a lookup table that stores address data used to forward data frames that are received by the bridge elements 426, 428, 430, and 432. For example, the bridge element 426 may compare address data associated with a received data frame to the address data stored within the forwarding cache 474.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 413, as set by an administrator or computing system. The Fiber Channel Forwarder 413, or FCoE switch, may facilitate connectivity between FCoE initiators and Fiber Channel fabrics. To illustrate, an FCoE data frame sent from the first virtual machine 458 and intended for a second virtual machine 463 may be addressed to the Fiber Channel Forwarder 413 in accordance with the FCoE standard. According to standard routing procedures, the Fiber Channel Forwarder 413 may receive and readdress the FCoE data frame for forwarding to the virtual machine 463.

The MAC address of the Fiber Channel Forwarder 413 may have been learned by the first server computer 402 during a discovery phase, when the Fiber Channel Forwarder 413 establishes communications with networked devices. During the discovery phase, the second server computer 404 may respond to broadcast queries from the first server computer 402. The Fiber Channel Forwarder 413 may discover the second server computer 404 from the query responses. After the discovery phase, a login phase may be initiated. A MAC address of the server computer 404 may be reassigned by the Fiber Channel Forwarder 413. The reassigned MAC address may be used for subsequent routing and communications between the server computers 402, 404. The Fiber Channel Forwarder 413 may facilitate storage of MAC addresses assigned to the server computers 402, 404.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 408. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 474, 476, 478, and 480 of the distributed virtual bridge 408 may have a format similar to the global forwarding table 411 of the controlling bridge 448. The forwarding caches 474, 476, 478, and 480 may have smaller memory capacities than the global forwarding table 411. The forwarding caches 474, 476, 478, and 480 may further be updated with address data learned from data frames that flow through the bridge elements 426, 428, 430, and 432.

The address data may additionally be updated with address data received from the global forwarding table 411. Invalid or changed address data that is updated within one or more of the forwarding caches 474, 476, 478, and 480 of the bridge elements 426, 428, 430, and 432 may be communicated to the global forwarding table 411 of the controlling bridge 448. For example, the bridge element 426 may learn a new MAC address of a newly added device that is configured to receive from or send data to the distributed virtual bridge 408.

The bridge element 426 may verify that a source MAC address included within a received data frame is allowed at a port by checking a list stored within a memory. The bridge element 426 may send a registration message to the controlling bridge 448 to update the global forwarding table 411 with the verified MAC address. The bridge element 426 may further store the MAC address within the forwarding cache 474. In another example, the bridge element 426 may identify a MAC address that is infrequently used. This infrequently used MAC address may be removed from the forwarding cache 474 to make storage room available for other MAC addresses. The bridge element 426 may send an update message to the controlling bridge 448 to have the MAC address removed from the global forwarding table 411.

Address data stored within the global forwarding table 411 may be communicated to one or more forwarding caches 474, 476, 478, and 480 of the distributed virtual bridge 408. For example, the bridge element 426 may receive a data frame that includes a destination MAC address that is not stored within the forwarding cache 474. To obtain information for forwarding the data frame, the bridge element 426 may send a query to a bridge element 439 configured to access the controlling bridge 448. The bridge element 439 may search the global forwarding table 411 for address data associated with the destination MAC address. If the address data is found, the bridge element 439 may forward the MAC address through the distributed virtual bridge 408 to the querying bridge element 426. The bridge element 426 may store the MAC address as address data within the forwarding cache 474. As with the global forwarding table 411, the address data included within the forwarding caches 474, 476, 478, and 480 of the distributed virtual bridge 408 may include both internal address information, as well as addresses that are external to the system 400.

Each of the bridge elements 426, 428, 430, and 432 may be connected to one or more transport layer modules 482, 484, 486, and 488. The transport layer modules 482, 484, 486, and 488 may include buffering used for attachment to the integrated switch router 442. The transport layer modules 482, 484, 486, and 488 may further provide a frame-based, Ethernet-like interface to the integrated switch router 442.

The transport layer modules 482, 484, 486, and 488 may each include a shared buffer used to transmit frames across the integrated switch router 442. Additional buffers of the transport layer modules 482, 484, 486, and 488 may be used to receive data frames from the integrated switch router 442. The buffers may be divided into different virtual lanes. Virtual lanes may include logically separated paths for data frame traffic flowing between a bridge element and a transport layer module. For example, there may be four virtual lanes between the bridge element 426 and the transport layer module 482. The transport layer modules 482, 484, 486, and 488 may include logic to recover from faulty microchips and links between a source and a destination. The transport layer modules 482, 484, 486, and 488 may maintain a strict ordering of packets within a particular virtual lane regardless of each data frame's path through the local rack interconnect network 490 and the computer system 400.

The integrated switch router 442 may communicate with the transport layer modules 482, 484, 486, and 488 and may facilitate routing and packet delivery to and from the local rack interconnect network 490. The local rack interconnect network 490 may include links to the bridge elements 426, 428, 430, and 432 located within the same chassis and rack, as well as links to the bridge elements 434-440 in different chassis and racks. The local rack interconnect network 490 may include point-to-point connections, or pipes, between the bridge elements 426, 428, 430, 432, and 433-440 of the distributed virtual bridge 408 with no frame loss and with in-order frame delivery.

The second server computer 404 may include a server computer similar to the first server computer 402 and may be similar to the server computer 202 of FIG. 2. As such, the second server computer 404 may be located within a different chassis and rack than the first server computer 402. Similar to the first server computer 402, the second server computer 404 may include a processor 499 coupled to a memory 497 and to an operating system 495. The processor 499 may include a controlling bridge (CB) 494, a global forwarding table (GFT) 496, and a Fiber Channel Forwarder (FCF) 498. The second server computer 404 may further include virtual machines 455, 457, 459, 461, 463, and 465.

A hypervisor 467 may be coupled to the virtual machines 457, 459. The hypervisor 467 may include a hypervisor virtual bridge 471 that allows direct communication between the virtual machines 457, 459. A hypervisor virtual bridge 473 of a hypervisor 469 coupled to the virtual machines 461, 463 may facilitate direct communication between the virtual machines 461, 463. For example, the hypervisor virtual bridges 471, 473 may register address data with the controlling bridge 448.

The second server computer 404 may also include one or more adapters 418, 420, 422, and 424, such as converged CEE network adapters. Each adapter 418, 420, 422, and 424 may be coupled to one or more of the virtual machines 455, 457, 459, 461, 463, and 465. The adapters 418, 420, 422, and 424 may each include a converged adapter virtual bridge 475, 477, 479, and 481. The converged adapter virtual bridges 475, 477, 479, and 481 may facilitate sharing of the adapters 418, 420, 422, and 424 by coordinating virtual machine access. The adapters 418, 420, 422, and 424 may each couple to one or more of the bridge elements 434, 436, 438, and 440 of the distributed virtual bridge 408. Each adapter 418, 420, 422, and 424 may include one or more CEE transmit ports that couple to one of the bridge elements 434, 436, 438, or 440.

Each bridge element 434, 436, 438, and 440 may include a forwarding cache 483, 485, 487, and 489 that includes address data used to forward data frames that are received by the bridge elements 434, 436, 438, and 440. The bridge elements 434, 436, 438, and 440 may each be connected to one or more transport layer modules 415, 417, 419, and 421. The transport layer modules 415, 417, 419, and 421 may include buffering used for the attachment to the integrated switch router 446. The transport layer modules 415, 417, 419, and 421 may further provide a frame-based, Ethernet-like interface to the integrated switch router 446 and may maintain packet ordering. A portion of the distributed virtual bridge 408 shown in FIG. 4 as located above the local rack interconnect network 490 and as associated with the server computers 402, 404 may be referred to as a north portion. The bridge elements 426, 428, 430, 432, 434, 436, 438, and 440 may be coupled to the adapters 410, 412, 414, 416, 418, 420, 422, and 424.

The I/O blade device 406 may be the I/O server computer 102 of FIG. 1. As such, the I/O blade device 406 may allow uplink connectivity to an external Ethernet network 492 via an integrated switch router 401 that is coupled to transport layer modules 423, 425, 427, 429, and 431.

The transport layer modules 423, 425, 427, 429, and 431 may each couple to a bridge element 433, 435, 437, and 439. The bridge elements 433, 435, 437, and 439 may each include a forwarding cache 441, 443, 445, and 447. The I/O blade device 406 may be categorized as being included within a south portion of the distributed virtual bridge 408 because the bridge elements 433, 435, 437, and 439 may be coupled to an uplink to the Ethernet network 492.

The I/O blade device 406 may include a memory 409, an operating system 491, and a processor 453 that includes the controlling bridge 448. The bridge element 439 may be coupled to the processor 453 via an Ethernet link connection. The transport layer module 431 may be coupled to a PCIe bus 444 that is coupled via a PCIe link connection to the processor 453 and the controlling bridge 448. The PCIe bus 444 may also be coupled to a PCIe slot 493. The processor 453 may further include a PCIM 451. Thus, the PCIM 451 and the controlling bridge 448 may share a common domain. In an embodiment, the controlling bridge 448 and the PCIM 451 may share a private, trusted interface to share base function device driver logic.

The controlling bridge 448 may communicate with the bridge elements 426, 428, 430, and 432-440 and other controlling bridges (not shown) of the computer system 400. The controlling bridge 448 may include firmware executing on the processor 453 that manages the bridge elements 426, 428, 430, and 432-440. For example, the controlling bridge 448 may be configured to divide a workload between the bridge elements 426, 428, 430, and 432-440, as well as perform synchronization procedures and failover operations.

The controlling bridges 448, 494 may be configured to interface with and program the bridge elements 426, 428, 430, 432-440 and the adapters 466, 468, 470, 472, 475, 477, 479, 481. More particularly, the controlling bridge 220 may be configured to generate and send a management frame to one or more of the bridge elements 426, 428, 430, 432-440 and the adapters 466, 468, 470, 472, 475, 477, 479, 481. The management frames may include instructions used to program operating parameters of the bridge elements 426, 428, 430, 432-440 and the adapters 466, 468, 470, 472, 475, 477, 479, 481 and other switches.

The controlling bridge 448 may include the Fiber Channel Forwarder 413. FCoE may offer the capability to transport fiber channel payloads on top of an Ethernet network. The Fiber Channel Forwarder 413 may execute the Fiber Channel Initialization Protocol to discover and initialize FCoE capable entities connected to an Ethernet cloud. The Fiber Channel Forwarder 413 may further include firmware that encapsulates and de-encapsulates Fiber Channel data frames (e.g., FCoE formatted data frames). In at least one embodiment, the Fiber Channel Forwarder 413 may translate between Ethernet and Fiber Channel protocols.

The controlling bridge 448 may additionally include the global forwarding table 411. The global forwarding table 411 may include address data (e.g., MAC addresses) that is registered and maintained through communication and cooperation with the bridge elements 426, 428, 430, and 432-440, and in some cases, the hypervisors 462, 467, and 469.

In one example, the global forwarding table 411 may maintain MAC addresses that have been learned by a bridge element 426. The bridge element 426 may register the address data with the controlling bridge 448. The controlling bridge 448 may update the global forwarding table 411 by adding the address data to the global forwarding table 411. Similarly, the bridge element 426 may cause the controlling bridge 448 to update the global forwarding table 411 by sending an update message to the controlling bridge 448. The update message may cause the controlling bridge 448 to delete a MAC address that has been aged out by the bridge element 426. A MAC address may further be deleted when the bridge element 426 has detected that the address data is no longer valid.

In another example, the hypervisor virtual bridge 464 may register MAC addresses or other address data with the controlling bridge 448. The global forwarding table 411 may include address data associated with addresses that are included within the system 400, as well as addresses that are external to the system 400.

FIG. 4 thus shows an embodiment of a system 400 that includes a distributed virtual bridge 408 configured for lossless, point-to-point, in-order data frame delivery. The controlling bridges 448, 494 may be configured to interface with and program the adapters 410, 412, 414, 416, 418, 420, 422, and 424 to reduce administrator workloads.

Figure 5:
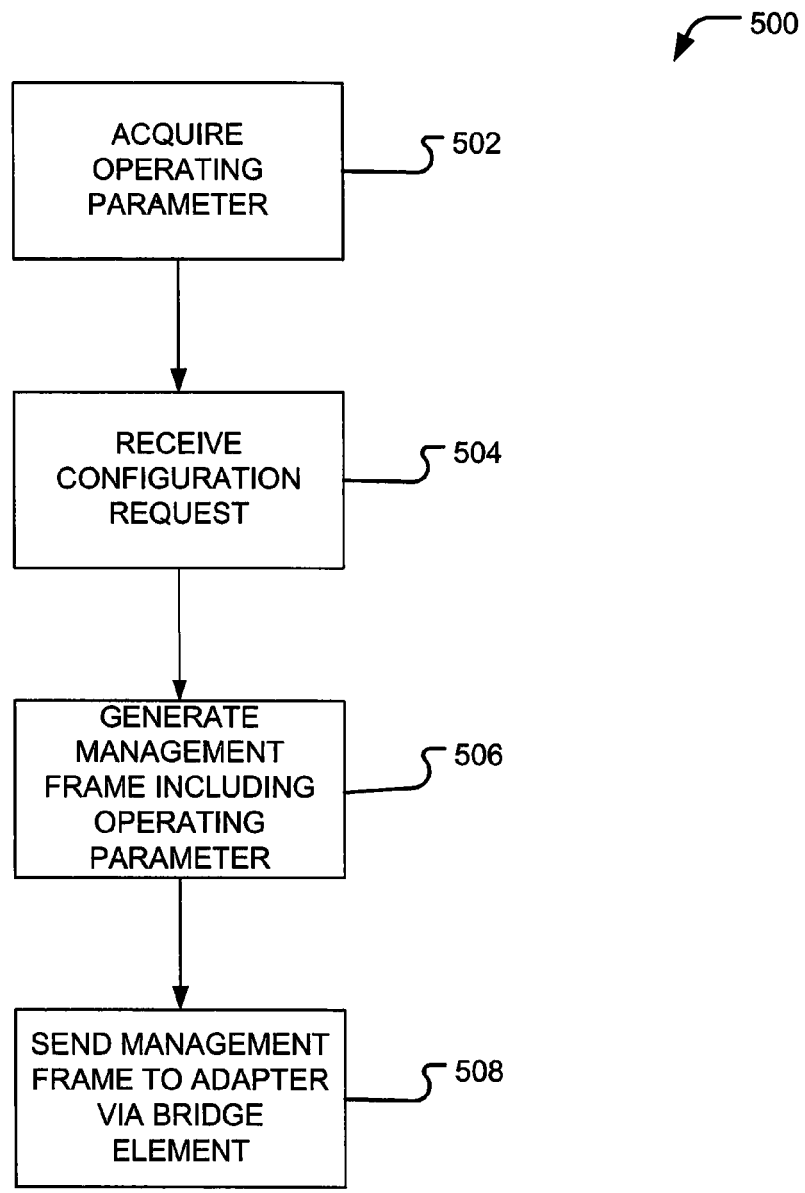
FIG. 5 is a flow diagram of a particular embodiment of a method to remotely configure an adapter.

FIG. 5 is a flow diagram of an embodiment of a method of configuring an adapter using a management frame and is generally designated 500. In a particular embodiment, the method 500 is performed by a controlling bridge, such as the controlling bridge 220 of the system 200 of FIG. 2.

At 502, a controlling bridge may acquire an operating parameter with which to program an adapter. For example, the controlling bridge 220 of FIG. 2 may access the base function device driver 250 of the PCIM 248. The controlling bridge 220 and the PCIM 248 may share a common domain or otherwise be connected by the distributed virtual bridge 206. The base function device driver 250 may include the operating parameter for configuring the base function 242 of the adapter 238. In another example, the controlling bridge 220 may have its own, remote base function device driver 272. The controlling bridge may receive operating parameters at the remote base function device driver 272 automatically or by an administrator.

The controlling bridge may receive a configuration request from an adapter, at 504. For instance, the adapter 238 may send a configuration request to the controlling bridge 220 of FIG. 2.

At 506, the controlling bridge 220 may generate a management frame that includes the operating parameter. For example, the controlling bridge may include an operating parameter within the configuration data payload of a management frame, such as the management frame 300 of FIG. 3.

The management frame may be sent to the adapter via the bridge element, at 508. For example, the controlling bridge 220 of FIG. 2 may forward the management frame through the distributed virtual bridge 206 to a bridge element 212 coupled to the adapter 238. In an embodiment, the management frame may be forwarded from the bridge element 212 to the adapter 238. The adapter 238 may process the management frame to retrieve an instruction to configure the operating parameter of the adapter 238. In another embodiment, the bridge element 212 may process the management frame and communicate the instruction to the adapter 238. For instance, the bridge element 212 may communicate the instruction to the adapter 238 during linkup. The adapter 238 may use the instruction to configure an operating parameter of the base function 242.

FIG. 5 thus shows a method 500 of configuring adapters using management frames routed through a bridge element. The method 500 may facilitate automated programming in a manner that reduces administrator workload. Increased programming efficiencies may enable greater scalability and accuracy in highly integrated environments.

Particular embodiments described herein may take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments may take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An apparatus comprising:
a plurality of racks, wherein each rack of the plurality of racks includes a plurality of chassis, wherein each chassis of the plurality of chassis includes server computers;
a plurality of bridge elements coupled to a plurality of server computers of the server computers, wherein each bridge element of the plurality of bridge elements is configured to forward data frames between server computers of different racks of the plurality of racks, server computers of different chassis of the plurality of chassis, or any combination thereof;
a plurality of adapters coupling the plurality of server computers to the plurality of bridge elements, wherein the plurality of adapters is located within, coupled, or any combination thereof to the plurality of server computers, including a first adapter of the plurality of the adapters coupled to a first bridge element of the plurality of bridge elements; and
a controlling bridge coupled to the first bridge element and configured to program an operating parameter of the first adapter.

2. The apparatus of claim 1, wherein the controlling bridge is further configured to send to the first bridge element a management frame comprising an instruction executable to configure the operating parameter of the first adapter.

3. The apparatus of claim 2, wherein the first bridge element forwards the management frame to the first adapter.

4. The apparatus of claim 2, wherein the first bridge element communicates the instruction to the first adapter.

5. The apparatus of claim 2, wherein the first bridge element communicates the instruction to the first adapter during linkup.

6. The apparatus of claim 2, wherein the management frame includes an ether type associated with a configuration protocol.

7. The apparatus of claim 1, wherein the controlling bridge is further configured to generate a management frame comprising an instruction executable to configure the operating parameter.

8. The apparatus of claim 1, wherein the controlling bridge is further configured to access a base function device driver of a peripheral interconnect manager to acquire the operating parameter.

9. The apparatus of claim 1, further comprising an entrusted interface between the controlling bridge and a peripheral interconnect manager.

10. The apparatus of claim 1, wherein the controlling bridge receives a configuration request sent from the first adapter.

11. The apparatus of claim 1, wherein the controlling bridge is further configured to program the plurality of bridge elements.

12. The apparatus of claim 1, wherein the first adapter includes at least one of a converged network adapter and a multi-root input/output virtualization adapter.

13. The apparatus of claim 1, further comprising an integrated switch router configured to route a management frame and a transport module coupled to the first bridge element and configured to provide a frame-based interface to the integrated switch router.

14. The apparatus of claim 1, wherein the first adapter is associated with a virtual local area network.

15. The apparatus of claim 1, wherein the controlling bridge is remote from the first adapter.

16. A method of configuring an operating parameter of an adapter, the method comprising:
for a plurality of racks, wherein each rack of the plurality of racks includes a plurality of chassis, wherein each chassis of the plurality of chassis includes server computers, and for a plurality of interconnected bridge elements coupled to a plurality of server computers of the server computers, wherein each bridge element of the plurality of interconnected bridge elements is configured to forward data frames between server computers of different racks of the plurality of racks, server computers of different chassis of the plurality of chassis, or any combination thereof and for a plurality of adapters coupling the plurality of server computers to the plurality of interconnected bridge elements, wherein the plurality of adapters is located within, coupled, or any combination thereof to the plurality of server computers, including a first adapter of the plurality of the adapters coupled to a first bridge element of the plurality of interconnected bridge elements:
generating a management frame at a controlling bridge, wherein the management frame includes an instruction to configure an operating parameter of the first adapter of the plurality of adapters,
communicating the management frame to the first bridge element of the plurality of interconnected bridge elements in communication with the controlling bridge, wherein the first bridge element is coupled to the first adapter; and configuring the operating parameter of the first adapter.

17. The method of claim 16, further comprising forwarding the management frame from the first bridge element to the first adapter.

18. The method of claim 16, further comprising communicating the instruction from the first bridge element to the first adapter.

19. The method of claim 16, further comprising enabling the controlling bridge to access a base function driver device of a peripheral interconnect manager.

20. A program product, comprising:

program code executable to:

for a plurality of racks, wherein each rack of the plurality of racks includes a plurality of chassis, wherein each chassis of the plurality of chassis includes server computers, and for a plurality of interconnected bridge elements coupled to a plurality of server computers of the server computers, wherein each bridge element of the plurality of interconnected bridge elements is configured to forward data frames between server computers of different racks of the plurality of racks, server computers of different chassis of the plurality of chassis, or any combination thereof, and for a plurality of adapters coupling the plurality of server computers to the plurality of interconnected bridge elements, wherein the plurality of adapters is located within, coupled, or any combination thereof to the plurality of server computers, including a first adapter of the plurality of the adapters coupled to a first bridge element of the plurality of interconnected bridge elements:

generate a management frame at a controlling bridge, wherein the management frame includes an instruction to configure an operating parameter of first adapter, to communicate the management frame to first bridge element of the plurality of interconnected bridge elements in communication with the controlling bridge, wherein the first bridge element is coupled to the first adapter, and to configure the operating parameter of the first adapter; and a non-transitory computer readable medium bearing the program code.

* * * * *